United States Patent [19]

Cargile

[11] 4,034,596
[45] July 12, 1977

[54] METHOD AND APPARATUS FOR TESTING SHOCK ABSORBERS AND THE LIKE

[76] Inventor: William P. Cargile, 206 El Granada Blvd., Half Moon Bay, Calif. 94019

[21] Appl. No.: 716,632

[22] Filed: Aug. 23, 1976

[51] Int. Cl.$^2$ .................................. G01M 17/04
[52] U.S. Cl. .................................. 73/11
[58] Field of Search ............... 73/11, 70, 71.7

[56] References Cited
U.S. PATENT DOCUMENTS 3,830,093  8/1974  Emerson .......................... 73/11

Primary Examiner—James J. Gill
Assistant Examiner—Anthony V. Ciarlante
Attorney, Agent, or Firm—Thomas H. Olson

[57] ABSTRACT

A transducer for placement in fixed relation to the axle/wheel assembly of a vehicle and adjacent to the body of the vehicle, the transducer including an antenna plate which in cooperation with the vehicle body forms a capacitance. The magnitude of the capacitance varies in response to variations in distance between the vehicle body and the antenna plate when the body is caused to experience oscillation on the springs thereof. Such oscillation is damped by the vehicle shock absorbers. The transducer includes a guard or shield which shields the antenna from significant capacitive reactance with respect to ground. An oscillator circuit wherein the frequency of oscillation is determined by the above mentioned capacitance, the oscillator circuit having a non-ground common to which the guard is connected. A method for testing shock absorbers by employment of the transducer and oscillator circuit which includes the steps of displacing the vehicle from a quiescent position to load the springs in the vehicle, releasing the vehicle body so that it can return to the quiescent position and measuring the time variation of the capacitance as the vehicle body vibrationally returns to the quiescent condition so as to afford an objective evaluation of the damping action of the vehicle shock absorbers.

7 Claims, 7 Drawing Figures

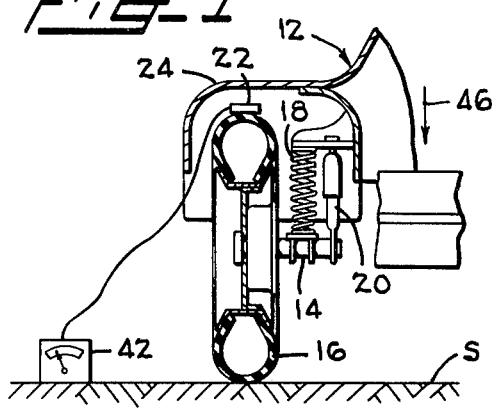
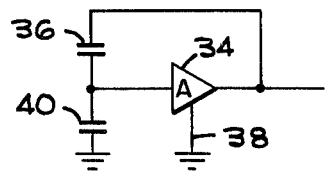
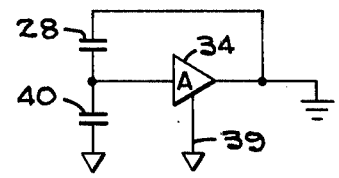
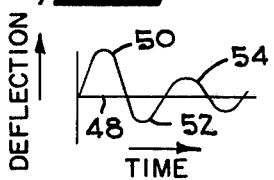
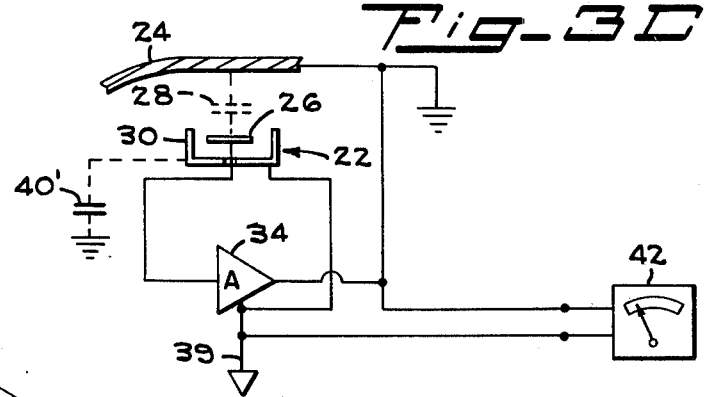
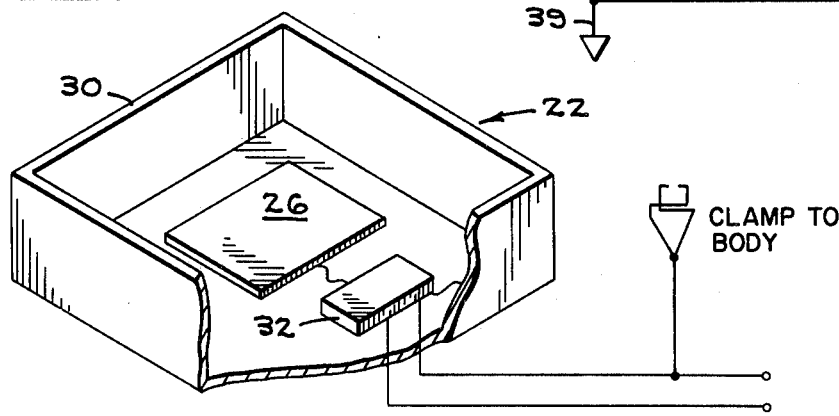
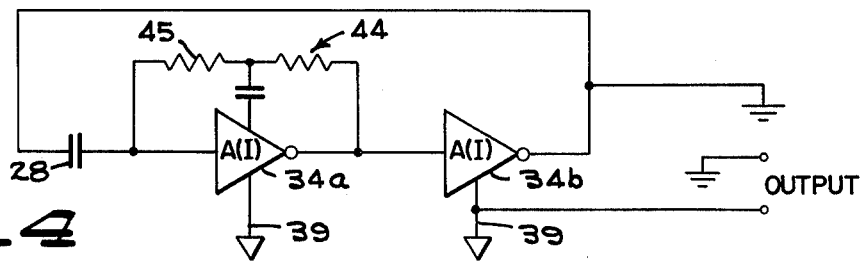

METHOD AND APPARATUS FOR TESTING SHOCK ABSORBERS AND THE LIKE

BACKGROUND OF THE INVENTION

1. Field of the Invention

This invention relates to a method and apparatus for testing shock absorbers and the like, and more particularly to such method and apparatus which establishes a capacitance between the axle/wheel assembly and the body of a vehicle and then measures the variation of such capacitance as the vehicle body is displaced from a quiescent position and permitted to vibrationally return to the quiescent position.

2. Description of the Prior Art

The principal prior art technique for testing shock absorbers is a subjective technique wherein one operates a vehicle and senses the vibrations experienced by the vehicle. Because of the significant subjectivity involved in this method, those who profit by replacing shock absorbers have a substantial motivation for perceiving defects that may not in fact exist.

The only known objective procedure for testing shock absorbers involves the connection of a pen to the vehicle body, placing a strip chart adjacent the pen, and advancing the strip chart as the vehicle is displaced from a quiescent position and permitted to return to that position. Such apparatus is not only cumbersome but requires substantial ability to analyze and interpret the graph produced by employment of such apparatus.

SUMMARY OF THE INVENTION

According to the present invention a small transducer is provided which transducer can be placed on the top of a vehicle tire so that the transducer is in spaced relation to the vehicle fender or other part of the vehicle body. The transducer has an antenna plate which forms one plate of a capacitor, the confronting part of the vehicle body forming the other plate of the capacitor. Movement of the vehicle body toward and away from the transducer antenna plate varies the capacitance and a measurement of the capacitance and the time variation thereof as the vehicle oscillates relative to the tire affords an objective indication of shock absorber performance.

There is substantial capacitance between the transducer and the ground or floor surface on which the body resides. Such capacitance, if permitted to exist in parallel with the transducer-body capacitance makes impossible measurements in variation of the transducer-body capacitance which are extremely small compared with the transducer-ground capacitance. Accordingly, the invention provides a transducer wherein the antenna plate is guarded or shielded from ground so that the transducer-body capacitance is not shunted by the transducer-ground capacitance.

An object of the present invention is to provide a transducer which can produce a capacitance relative to the vehicle body which is not shunted by the transducer-ground capacitance. This object is achieved in accordance with the present invention by supporting the antenna plate in a metallic housing and by connecting the metallic housing to a common and ungrounded circuit point in an oscillator of which the transducer-body capacitance is the frequency determinative element so that variation in the latter capacitance will effect a measurable variation in the frequency of oscillation.

Another object of the present invention is to provide an apparatus for producing a measurable signal which is independent of adjacent capacitances of large magnitude. This object is achieved in accordance to the invention by shielding from the transducer antenna plate referred to above the capacitance between the transducer and the ground, such shielding being achieved by providing metallic walls substantially surrounding the antenna plate and by connecting the wall to the common point in the oscillator circuit which the body-transducer capacitance is the frequency determining element.

A further object is to provide a method and apparatus for testing shock absorbers in situ. Achievement of this object promotes frequent testing of shock absorbers because the testing requires no disassembly of the vehicle and is made possible by providing a transducer that is small enough to be placed on top of the vehicle tire without employment of fasteners or like accoutrements.

The foregoing together with other objects features and advantages will be more apparent after referring to the following specifications and the accompanying drawing.

BRIEF DESCRIPTION OF THE DRAWING

FIG. 1 is a diagrammatic view of a system in accordance with the invention installed on a vehicle.

FIG. 2 is a perspective view of a transducer according to the present invention, portions being broken away to reveal internal details.

FIG. 3A is a schematic diagram of an oscillator connected as taught by the prior art to produce a signal determined by capacitance.

FIG. 3B is a schematic diagram showing an oscillator connected according to the present invention.

FIG. 3C is a schematic diagram of an oscillator of FIG. 3B connected in the apparatus of the invention.

FIG. 4 is a more detailed block diagram of an oscillator employed as an element in the present invention.

FIG. 5 is a plot of vehicle deflection versus time showing the typical time variation of a vehicle as it is damped by the presence of a shock absorber.

DESCRIPTION OF THE PREFERRED EMBODIMENT

Referring more particularly to the drawings reference numeral 12 indicates a fragment of a motor vehicle. Vehicle 12 is typically supported on an axle 14 which is supported for movement over a road surface S by rubber tired wheels, one of which is shown in FIG. 1 at 16. The body of vehicle 12 is suspended on axle 14 by a spring 18 and there is a shock absorber 20 extending between the body and the axle to damp vibrations between the body and the axle as wheel 16 encounters irregularities in surface S. Shock absorber 20 is subject to gradual deterioration with age and objective measurement of the performance of the shock absorber permits replacement thereof at the appropriate time.

According to the invention there is a transducer 22 which is placed on the top of wheel 16 in confronting relation to a fender 24 which constitutes a part of the body of vehicle 12. Transducer 22 includes a flat conductive antenna plate 26 which forms in cooperation with the surface of fender 24 a capacitance, such capacitance being identified schematically at 28 in FIG. 3C. Plate 26 is insulatively supported in a metal boxlike shield 30 which forms a guard surrounding plate 26 to avoid interaction between the plate and wheel 16 which is at the same (ground) potential as is fender 24. Mounted within boxlike shield 30 is an integrated circuit element 32, which constitutes an oscillator, the frequency of which is controlled by capacitance 28 which in turn is proportional to the distance between the transducer and fender 24.

In order to more clearly explain the operation of transducer 22 as a frequency determining element in the oscillator circuit, a conventional oscillator configuration will be briefly described in connection with FIG. 3A. In FIG. 3A there is an amplifier 34 the output of which is fed back through a capacitor 36 to sustain oscillation at a frequency determined by the magnitude of capacitor 36. Typically the common point of amplifier 34 is grounded, as shown at 38. In FIG. 3A a parallel capacitor 40 is shown; if the capacitance of capacitor 40 is large as compared to the capacitance of capacitor 36, variations in capacitor 36 will have an insignificantly small effect on the frequency of oscillation of the circuit. If the circuit of FIG. 3A were employed with transducer 22 in the present environment, capacitor 40 would be formed by the transducer antenna plate and ground; such capacitor is of relatively large value so that any variation in the capacitance 36, represented by the capacitance between plate 26 and the vehicle body would have little or no effect on the frequency of oscillation of the circuit.

FIGS. 3B and 3C depict an oscillator circuit arranged for employment in practicing the present invention. The common point of amplifier 34 is not grounded; instead the output terminal of the amplifier is grounded. As shown in FIG. 3C the common point is connected to boxlike shield 30 so that capacitor 28 substantially exclusively dictates the frequency of oscillation of the oscillator circuit. Capacitance between shield 30 and ground, indicated at 40' in FIG. 3C, does not materially influence the input of amplifier 34 and therefore does not shunt or otherwise override the affect of variations in capacitor 28. Because the capacitance of capacitor 28 depends substantially exclusively on the distance between fender 24 and antenna plate 26 within transducer 22, frequency of oscillation of the circuit will vary with such distance so as to produce a signal the frequency of which is a function of the instantaneous distance between the tire and the fender. Such signal is connected to a signal analyzing and display unit 42 in which it is reduced by any suitable circuitry to produce a visual output indicating whether the shock absorber 20 conforms to specifications or requires replacement. Thus, operating amplifier 34 with the common point floating (i.e. not grounded) eliminates the adverse affects of large spurious capacitances.

Amplifier 34 has been disclosed somewhat schematically hereinabove; a more detailed disclosure of the actual circuitry is shown in FIG. 4. As can be seen in FIG. 4, there are two inverting amplifiers 34a and 34b which are cascaded so that the feedback signal from the output of amplifier 34b to the input of amplifier 34a through capacitor 28 is phased to sustain oscillation at a frequency determined by the capacitance in conjunction with a resistance 45. Additionally, amplifier 34a is provided with a biasing network 44 which establishes the DC input level of the amplifier at the threshold value of the amplifier in order to facilitate starting of oscillation. The output of the amplifier of FIG. 4 is taken between ground and the common circuit point 39. Although not shown in FIG. 4, common point 39 is connected to shield 30 of transducer 22 so as to avoid shunting capacitor 28 with stray or spurious capacitances.

In operation, transducer 22 is placed on the top of the vehicle tire with antenna plate 26 positioned in confronting relation to fender 24 as shown in FIG. 1. This establishes capacitor 28 at some fixed or reference value which in turn establishes the frequency of oscillation by the oscillator formed by amplifier 34. While the vehicle body is in a quiescent state, analysis and display circuit 42 can be zeroed based on the frequency of oscillation at the quiescent position. Thereafter, vehicle body 12 is displaced from the quiescent condition, such as by applying force to a part of the body of the vehicle in the direction of an arrow indicated at 46. The force is terminated so that the body tends to return to the quiescent state in a manner dictated by gravity, the force stored in spring 18 and the damping action of shock absorber 20. Movement of the body with respect to transducer 22 effects a corresponding variation in the capacitance of capacitor 18 which in turn causes a variation in frequency in oscillation of the oscillator. Such varying frequency signal is analyzed by circuitry within analyzing and display unit 42 and an indication is afforded whether the damping action of shock absorber 20 is within specified ranges.

In further explanation of the operation of the apparatus and method of the invention, attention is invited to FIG. 5, a plot of vehicle deflection versus time. Horizontal axis 48 represents the position of the vehicle body with respect to axle 14 at the quiescent position and curve segment 50 indicates displacement in response to application of force 46. On termination of the force, the vehicle body returns to the quiescent state and over shoots it as shown by curve segment 52. Movement of the vehicle is reversed back toward the quiescent point and a further over shoot can occur as shown at curve segment 54. These oscillations continue in a damped manner until the quiescent position is again achieved, the particular oscillatory pattern manifested by variations in oscillator frequency indicating the operation of the shock absorber in finally damping out the oscillations of the car body.

In the foregoing description of the preferred embodiment of the invention the operational details of analyzing and displaying unit 42 have not been disclosed. The reason for this is that the specific nature of the unit can take one of any number of forms well within the purview of the skilled artisan. The specific output produced by the unit can be any number of forms depending on, among other things, the skill of the persons who will operate the equipment. For example, in one system designed according to the present invention the output of unit 42 is a D'Arsonval meter having a reference mark at or about mid range and calibrated so that a meter reading above the mark indicates a defective shock absorber and a reading below the mark indicates an acceptable shock absorber.

Thus it will be seen that the present invention provides a method and apparatus for testing shock absorbers which can be practiced without cumbersome attachments to the vehicle and which can produce an objective indication of shock absorber condition. Although one embodiment has been shown and described it will be obvious that other adaptations and modifications can be made without departing from the true spirit and scope of the invention.

What is claimed is:

1. Apparatus for in situ testing of vehicular shock absorbers comprising a transducer having an antenna member, means for supporting said transducer immovably with respect to the vehicle axle so that said antenna forms a capacitance with a portion of the body of said vehicle, and means for measuring and analyzing the time variation of said capacitance in response to motion of the body relative the axle.

2. Apparatus according to claim 1 wherein said measuring and analyzing means includes an oscillator having a feedback circuit, said capacitance being included in said feedback circuit so that the frequency of oscillation of said oscillator is proportional to the instantaneous magnitude of said capacitance.

3. Apparatus according to claim 2 wherein said oscillator includes an amplifier having a common circuit point, said common circuit point being isolated from ground, a conductive housing surrounding said antenna member, and means for connecting said housing to said common circuit point.

4. Apparatus according to claim 3 wherein said amplifier is mounted in said housing adjacent said antenna member.

5. A method for in situ testing of vehicular shock absorbers comprising the steps of providing a transducer having a conductive antenna plate, supporting said transducer in immovable relation to the vehicle axle so that said conductive antenna plate forms a capacitance with the vehicle body, displacing the vehicle body from a quiescent position, terminating said displacing step to permit the vehicle body to return to the quiescent position and measuring the time variation of said capacitance as the vehicle body returns to the quiescent position.

6. A method according to claim 5 including the step of shielding said antenna plate from ground potential so that the capacitance between the antenna plate and the vehicle body is substantially free from being shunted by stray capacitances.

7. A method according to claim 5 wherein said measuring step includes the step of providing an oscillator with a feedback circuit, connecting the capacitance in the feedback circuit so that the magnitude of the capacitance determines the frequency of oscillation and measuring the variation in frequency of the oscillator.

* * * * *